United States Patent [19]

Sanders et al.

[11] 4,274,361
[45] Jun. 23, 1981

[54] ELECTROSTATIC AND MAGNETIC TRANSFER ENHANCING APPARATUS FOR CONDUCTING AND MAGNETICALLY ATTRACTING TONER

[75] Inventors: John R. Sanders, Maitland; Richard L. Poythress, Longwood; Richard E. Shultz, Maitland; William F. Buholtz; Richard C. Fedder, both of Longwood, all of Fla.

[73] Assignee: Burroughs Corporation, Detroit, Mich.

[21] Appl. No.: 90,743

[22] Filed: Nov. 2, 1979

[51] Int. Cl.³ .......................................... G03G 15/08
[52] U.S. Cl. .................................... 118/653; 118/623; 355/3 TR
[58] Field of Search ............... 118/644, 647, 648, 649, 118/650, 651, 652, 653; 430/126; 427/25

[56] References Cited

U.S. PATENT DOCUMENTS

| | | | |
|---|---|---|---|
| T969,009 | 4/1978 | Lahut et al. | 118/644 X |
| 3,992,557 | 11/1976 | Kubo et al. | 430/126 |
| 4,114,536 | 9/1978 | Kaneko et al. | 430/126 X |
| 4,171,900 | 10/1979 | Brugger et al. | 118/658 |

*Primary Examiner*—Bernard D. Pianalto
*Attorney, Agent, or Firm*—Carl Fissell, Jr.; Edmund M. Chung; Kevin R. Peterson

[57] ABSTRACT

Electrostatic and magnetic transfer apparatus for conducting and magnetically attracting electronically conductive toner from the surface of a dielectric drum to a secondary substrate such as plain paper wherein a fixed permanent magnet disposed within a hollow cylindrical roller located at the image transfer point within a portion of a continuous loop of semi-conductive material supplies additional attractive force between the toner and the substrate exclusively at the image transfer point which in combination with the electrostatic transfer force applied to the imaged dielectric surface of the drum by means of a voltage potential applied to the hollow cylindrical roller, produces a dense, well defined pattern of intelligence replicating what was originally applied to the dielectric surface.

8 Claims, 1 Drawing Figure

ELECTROSTATIC AND MAGNETIC TRANSFER ENHANCING APPARATUS FOR CONDUCTING AND MAGNETICALLY ATTRACTING TONER

BACKGROUND OF THE INVENTION

1. Field of The Invention

The present invention relates in general to the field of electrographics and more specifically, to an improved apparatus and method for transferring toner images from a dielectric surface to a secondary substrate such as plain paper.

2. Summary of the Invention

The present invention relates to improved apparatus and method for solving the problem of transferring primarily electronically conducting and magnetically attracting toner from the surface of a dielectric drum to a second substrate such, for example, as plain paper. Utilization of the forces of magnetic attraction in addition that obtained by electrostatic means, causes a greater percentage of toner to be transferred to the second substrate producing sharper edge resolution. The primary problem solved by the apparatus of the present invention is that of transferring toner which is electronically conductive rather than insulating, to a substrate which is relatively electronically conductive such as plain paper.

BRIEF DESCRIPTION OF THE FIGURE

The single FIGURE of drawing is a schematic representation of apparatus embodying the present invention, illustrated in side elevation.

DESCRIPTION OF THE PREFERRED EMBODIMENT

Figure 1:
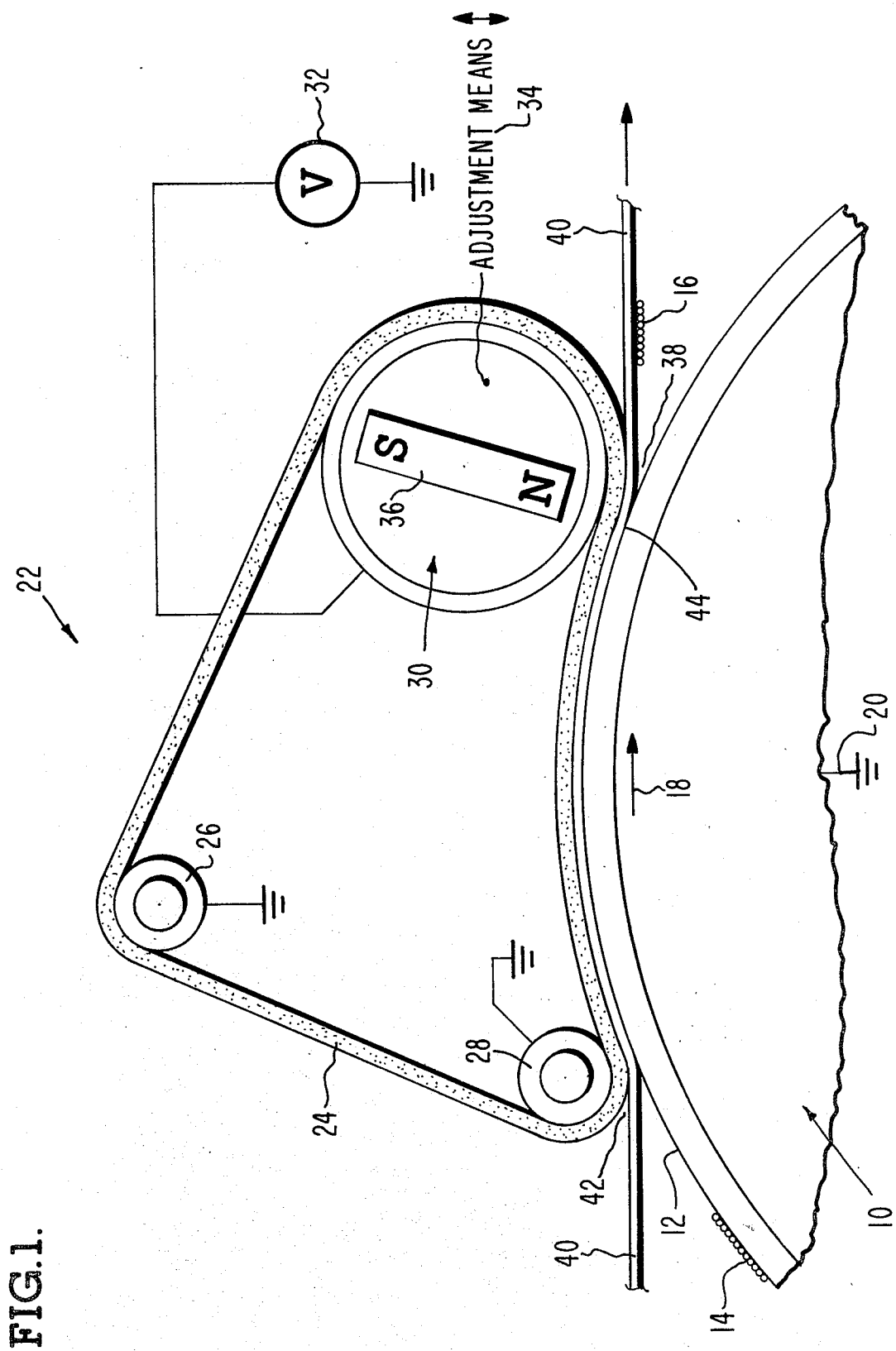

Most imaging techniques involving the transfer of toner particles from a drum, for example, to a secondary substrate such, for example, as paper, involve the use of a device (either a roller or a thin wire) to generate an electrostatic field to cause attraction of insulating toner from a dielectric drum to the substrate. In this type of apparatus, good transfer occurs due to the insulating nature of the toner. In other systems, where, for example, conductive toner is used, good transfer is achieved when the secondary substrate is an insulator, such as Mylar or special dielectric paper. The problem with both of these systems or methods is that good toner transfer cannot be achieved when electronically conducting toner is transferred to a substrate which is not insulating, such as the case with plain paper. This is especially so and extremely difficult, if not impossible, during conditions of high ambient relative humidity; although some toner transfer occurs, it is usually characterized by poor resolution (scatter of toner particles) and low optical density.

The present invention makes use of the fact that some toner transfer occurs with electrostatic means. However, enhancement of the transfer phenomenon is produced by making use of the fact that the toner particles are magnetically attracting. Thus, by appropriately configuring the transfer hardware, i.e. apparatus, the magnetic and electrical properties of the toner are utilized to maximize the total amount of toner which is removed from the drum and attracted to the secondary substrate with excellent quality.

As seen in the drawing, an electrically conductive member 10 such as an aluminum drum is provided with a dielectric surface 12 on which an electrostatic image 14 is formed of electronically conductive magnetically attracting toner particles 16. It is assumed for purposes of this description that electrostatic means (not shown) have provided an intelligible image 14 on the dielectric surface 12 and that well known means have been provided (also not shown) for rotating the drum 10 (and other additional members as required) in the direction of the arrow 18. The drum hub is electrically at ground potential as indicated at 20.

Arranged adjacent to the drum 10 and in fairly close proximity thereto is a toner enhancing transfer apparatus 22. The essential elements of apparatus 22 include a semi-conductive endless loop or belt 24 which is arranged to pass around an upper tension adjusting roller 26 and a lower configuring roller 28. Both rollers 26 and 28 are electrically conductive and are maintained at electrical ground potential relative to rotatable member 39.

Member 30 is a thin, conductive, shell-like cylindrical assembly arranged for rotation within the endless semi-conductive belt or loop 24. A source of, say positive electrical potential 32 is connected to the shell-like member 30. Member 30 is provided with an independent adjustment means 34 for moving member 30 relative to the dielectric surface 12. Roller 26 is utilized to adjust and maintain suitable tension on belt or loop 24. Roller 28 is utilized to configure the loop 24 to the curved periphery of the upper portion of the drum 10. The adjustment of this roller can apply suitable pressure to drum 10.

Disposed within shell-like member 30 is a fixed permanent magnet 36, which in this embodiment is polarized as shown with its South magnetic pole at the top and its North magnetic pole at the bottom and arranged so as to be perpendicular or normal to the exit nip 38 between member 30 and the curved surface of drum 10.

A secondary substrate, in this case plain paper 40, is arranged to be moved into the entry nip 42 between roller 28 and belt 24 and dielectric surface 12 of drum 10. Paper 40 is carried by the belt 24 and drum 10 around the periphery of drum 10 to exit at nip 38 between roller 30 and dielectric surface 12.

Since the belt 24 is a semi-conductor, the electrical potential from source 32 is applied through the belt 24 at the transfer point 44 between magnet 36 and dielectric surface 12. However, the applied electrical potential will diminish rapidly away from shell member 30 due to the fact that rollers 26 and 28 are at electrical ground potential. Permanent magnet 36 on the other hand, is radiating its lines of magnetic flux outwardly toward the dielectric surface 12 with a large flux density at image transfer point 44. This causes an additional force of attraction between the toner 16 and substrate 40 at the transfer point 44. Thus, there is at the transfer point 44 an electrostatic and a magnetic force aiding each other causing the toner 16 to adhere to substrate 40 in a dense, well defined pattern replicating the image pattern on the dielectric surface 12.

The significance of the configuration of the belt or loop 24 is that the required transfer potential can be obtained at transfer point 44 while no potential is obtained at the substrate entry point 42 which could cause premature attraction of the toner 16 to the substrate resulting in scattering of toner particles and loss of definition, i.e. poor image resolution.

What is claimed is:

1. Electrostatic-magnetic transfer apparatus for automatically controllably transferring an electrostatic toned image from a dielectric surface to a secondary substrate comprising,
   a movable member having a dielectric surface thereon, said movable member being at ground potential and said surface provided with an electronically conductive, electrostatically toned image,
   endless semi-conductive means arranged adjacent to said dielectric surface,
   a secondary substrate movable with said dielectric surface and said semi-conductive means,
   means operably associated with said semi-conductive means for applying suitable tension to said means and for configuring said means to said dielectric surface,
   cylindrical movable means disposed within said endless semi-conductive means including means for applying an electrical potential thereto, and
   magnetic means disposed internally of said movable means having a fixed magnetic polar orientation relative to the periphery of said dielectric surface providing a potential transfer point perpendicular to said dielectric surface such that the magnetic lines of force from said magnetic means are in an aiding direction relative to the electrostatic forces on said dielectric surface causing said electronically conductive toner to adhere to said secondary substrate at the potential transfer point in a dense, well defined image pattern without scattering characteristic of the image pattern previously carried by said dielectric surface.

2. The invention in accordance with claim 1, wherein said dielectric surface is carried by a drum member having an electrically grounded hub relative to said semi-conductive means.

3. The invention in accordance with claim 1, wherein said semi-conductive means is an endless rotatable belt.

4. The invention in accordance with claim 1, wherein said secondary substrate is plain paper.

5. The invention in accordance with claim 1, wherein said means for applying tension to said semi-conductive means and said means for configuring said semi-conductive means to said dielectric surface are electrically conductive rotatable roller members arranged at electrical ground potential and wherein said configuring roller provides an entry point for said secondary substrate relative to said dielectric surface.

6. The invention in accordance with claim 1, wherein said cylindrical means is a thin conductive shell-like member including electrical connection to a source of positive potential providing an electrical potential transfer point at the periphery of said cylindrical shell-like member.

7. The invention in accordance with claim 1, wherein said magnetic means is a fixed permanent magnet disposed within said shell-like member and aligned relative to the axis thereof and the surface of said dielectric member so that the radiated magnetic lines of force aid and add to the electrostatic forces of the toned dielectric surface image providing the required transfer potential at the transfer point where no potential is obtained or produced at the entry point.

8. The invention in accordance with claim 1, wherein adjusting means is provided for said shell-like member cooperating with said adjusting and configuring means such that said secondary substrate is entrapped in confronting relationship between said semi-conductive means and said dielectric surface enabling said secondary substrate to be moved relative thereto.

* * * * *